Patented Sept. 26, 1922.

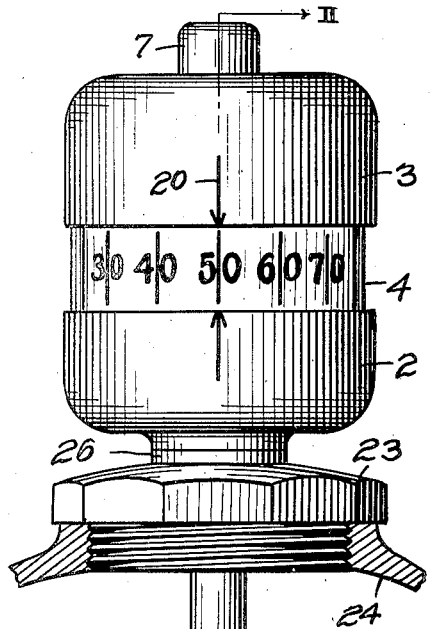
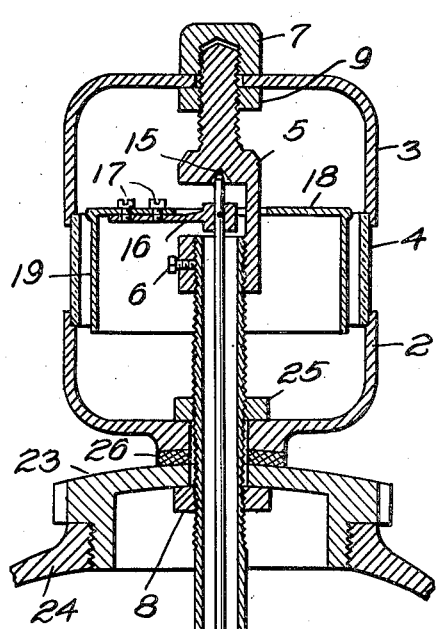
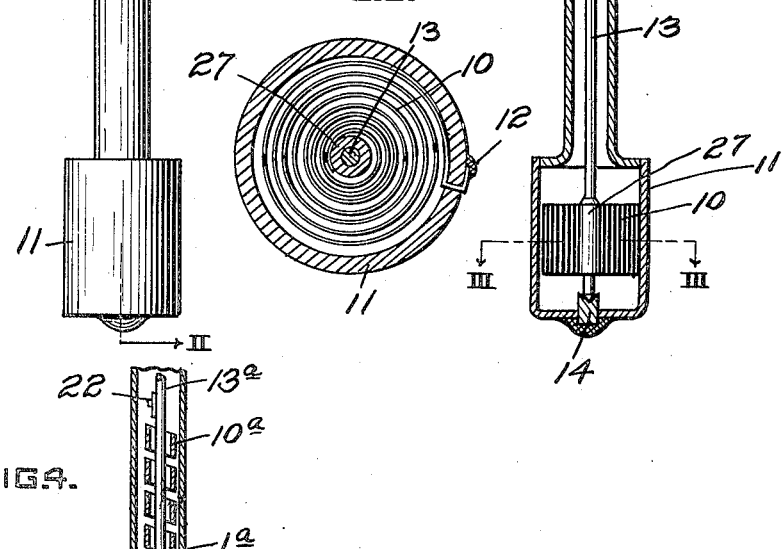
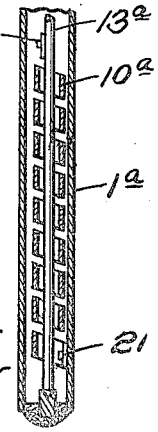

1,429,975

UNITED STATES PATENT OFFICE.

ALBERT ROTH AND PATRICK A. FERGUSON, OF PITTSBURGH, PENNSYLVANIA.

TEMPERATURE INDICATOR.

Application filed September 24, 1920. Serial No. 412,439.

*To all whom it may concern:*

Be it known that we, ALBERT ROTH and PATRICK A. FERGUSON, citizens of the United States, and residents of Pittsburgh, in the county of Allegheny and State of Pennsylvania, have invented a new and useful Improvement in Temperature Indicators, of which the following is a specification.

The object of this invention is to provide a thermometer which may be used for various purposes, but which is particularly suitable for indicating the temperature of water in the radiator of an automobile or like vehicle.

The invention is illustrated in the accompanying sheet of drawings, in which Fig. 1 is a side view of the thermometer shown attached to the radiator of an automobile; Fig. 2 a longitudinal central sectional view taken on the line II—II, Fig. 1; Fig. 3 a sectional view to enlarged scale taken on the line III—III, Fig. 2 and Fig. 4 a longitudinal sectional view of the lower portion of the thermometer illustrating a modification of construction.

The thermometer comprises a casing having a temperature indicating mechanism in one end thereof, a thermally-expandable element in the other end thereof, and a connection between such element and indicating mechanism so that the mechanism will move in response to the thermal expansion and contraction of the element.

The casing preferably includes a tube 1 of small bore, and a housing consisting of two oppositely-disposed cup-shaped members 2 and 3, between the adjacent edges of which there is arranged a transparent ring 4 which may be constructed of glass or other transparent material. For attaching the housing members, 2, 3 and 4, to the tube 1, there is secured to the upper end of the tube a bracket 5 threaded interiorly at its lower end and exteriorly at its upper end. After the lower end of the bracket 5 has been adjusted to its proper position on the tube 1, it may be held in such position by means of a set screw 6. A cap nut 7 engages the outer end of the bracket and bears upon the outer face of the housing member 3, clamping the several housing members between it and a nut 8 which engages the tube 1. To guard against excessive pressure being placed upon the transparent ring 4 when the cap nut 7 is screwed upon the bracket 5, a nut 9 may be arranged on the bracket within the housing member 3 in the position indicated.

In the form of the invention illustrated in Figs. 1, 2 and 3, the thermally expandable element is a bi-metallic coiled ribbon 10 arranged within a drum 11 attached to, and somewhat larger in diameter than, the tube 1. The outer end of the ribbon 10 may be attached to the drum 11 by extending the end of such ribbon through a slot in the drum and bending the ribbon backwardly and soldering it upon the outer face of the drum as indicated at 12. The inner end of the ribbon 10 is attached to a sleeve or hub 27, which in turn may be soldered or otherwise secured to the shaft 13. The opposite ends of this shaft are pointed and extend into pivot bearings 14 and 15, the lower pivot bearing 14 being attached to the drum 11 and the upper pivot bearing 15 being formed in the bracket 5.

To the upper end of the rotatable shaft 13 there is attached a laterally extending arm 16, to which there is secured by means of screws 17 an inwardly extending flange 18 of a graduated ring 19. The graduations of the ring 19 are indicated in Fig. 1, the thermometer being so calibrated that the graduation on the ring adjacent to an indicating arrow or line 20 will show the temperature to which the expandable element 10 is subjected. When the thermostat is used for indicating the temperature of water in an automobile radiator, the graduations on the ring 19 will have a minimum range from the freezing to the boiling point of water.

In case it is desirable to use a thicker and hence more rigid thermally expandable element, such element may be formed as a spiral coil $10^a$ in the manner indicated in Fig. 4. The lower end of the spiral coil may be suitably attached at 21 to the tube $1^a$, and the upper end may be attached as at 22 to the shaft $13^a$. In this manner a more rigid bi-metallic thermally expandable element may be used in a smaller diameter space than when such element is coiled in the manner indicated in Figs. 2 and 3.

As previously indicated, the thermometer is particularly suitable for indicating the temperature of water in the radiator of an automobile. The invention, as far as some features of it are concerned, includes provision for such use. As illustrated in the drawings, the tube portion 1 of the casing extends through a central opening of a cap 23 for closing the filling opening of a radiator, such cap being exteriorly threaded to engage a radiator 24. The cap is rotatable upon the tube 1, and its connection to such tube is such that free rotation of the cap is resisted. Preferably the cap 23 is attached to the tube 1 by means of a pair of clamping nuts, of which the nut 8 may be one, and a nut 25 within the housing member 2 the other of such nuts, and between these nuts and adjacent to one face of the cap 23 there is arranged a gasket 26.

When the radiator cap is removed for filling the radiator with water, the thermometer is of course simultaneously removed. Thereafter the cap may be screwed into the radiator, and if it should be screwed down to a greater or less extent than its position before having been removed, the thermometer casing may be turned against the resistance of the gasket 26 until the indicating marks 20 on the casing face the driver of the automobile.

In the operation of the thermometer the thermally expandable element 10 or 10$^a$ expands and contracts in proportion to the temperature to which it is subjected. In response to such expansion and contraction the shaft 13 is proportionately rotated in its pivot bearings 14 and 15, and in turn the ring 19 is rotated. The result is that there is a clear indication of the temperature to which the thermally expandable element is subjected. The color of the face of the ring 19 and the size and color of the temperature-indicating numerals on it may be and preferably are such that the numerals may be easily read at a considerable distance.

According to the provisions of the patent statutes, we have described the principle and operation of our invention, together with the constructions representing embodiments thereof. However, we desire to have it understood that, within the scope of the appended claims, the invention may be practiced by other forms of construction than specifically shown and described.

We claim:

1. A temperature indicator comprising a casing including a small bore tube and a housing attached to the outer end thereof, said housing comprising two oppositely-disposed cup-shaped members and an intervening ring of transparent material, a thermally expandable element in and attached at one end to said tube, a shaft rotatably mounted in said tube and attached to the other end of said element, and an exteriorly graduated ring attached to said shaft and positioned within said housing adjacent to said transparent ring.

2. A temperature indicator, comprising a casing including a small bore tube and a housing attached to the outer end thereof, a thermally expandable element in and attached at one end to said tube, a bracket adjustably attached to the outer end of said tube and provided with a pivot bearing, a pivot bearing at the inner end of said tube, a shaft having its ends rotatably mounted in said pivot bearings and attached to the other end of said expandable element, and a graduated ring attached to said shaft.

3. In a temperature indicator, the combination of a small bore tube insertable through the wall of a casing, a thermally expandable element in and attached at one end to said tube, a shaft rotatably mounted in said tube and attached to the other end of said element, a cylindrical casing attached to the outer end of said tube and having a transparent window in its side wall, and a cylinder attached to the outer end of said shaft and provided on its outer face with graduations visible through said window.

In testimony whereof, we have hereunto set our hands.

ALBERT ROTH.
PATRICK A. FERGUSON.

Witnesses:
PAUL N. CRITCHLOW,
EDWIN O. JOHNS.